Oct. 2, 1951 T. W. DELANEY 2,570,026
MACHINE FOR CUTTING CONTOURS IN PIPE SECTIONS FOR
JOINING MAIN AND BRANCH PIPES AT A DESIRED ANGLE
Filed April 20, 1949 9 Sheets-Sheet 3
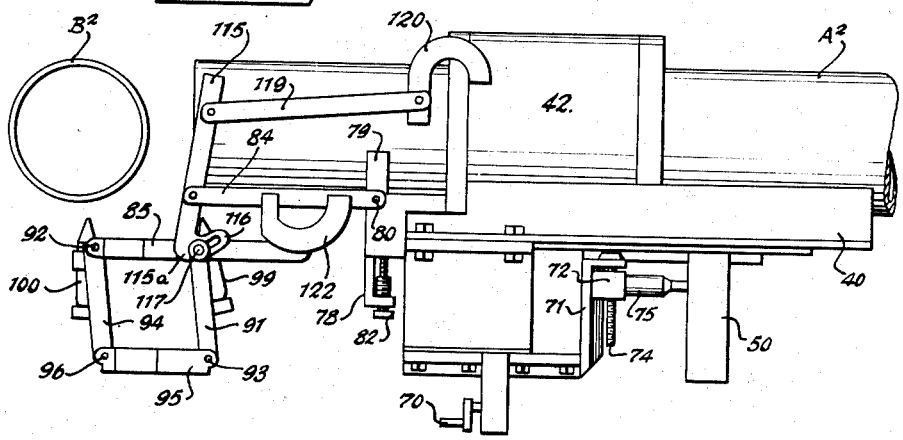
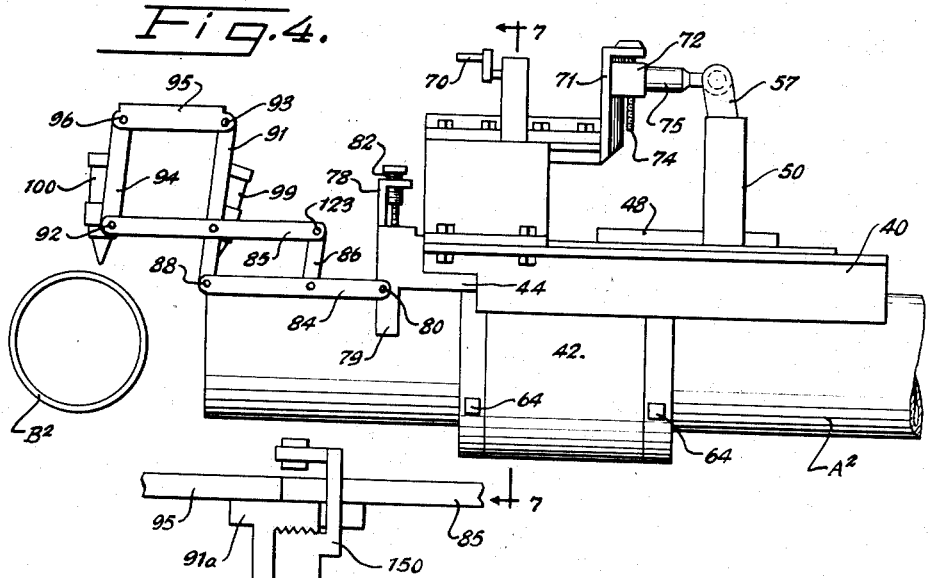
INVENTOR.
THOMAS W. DELANEY
BY
ATTORNEYS

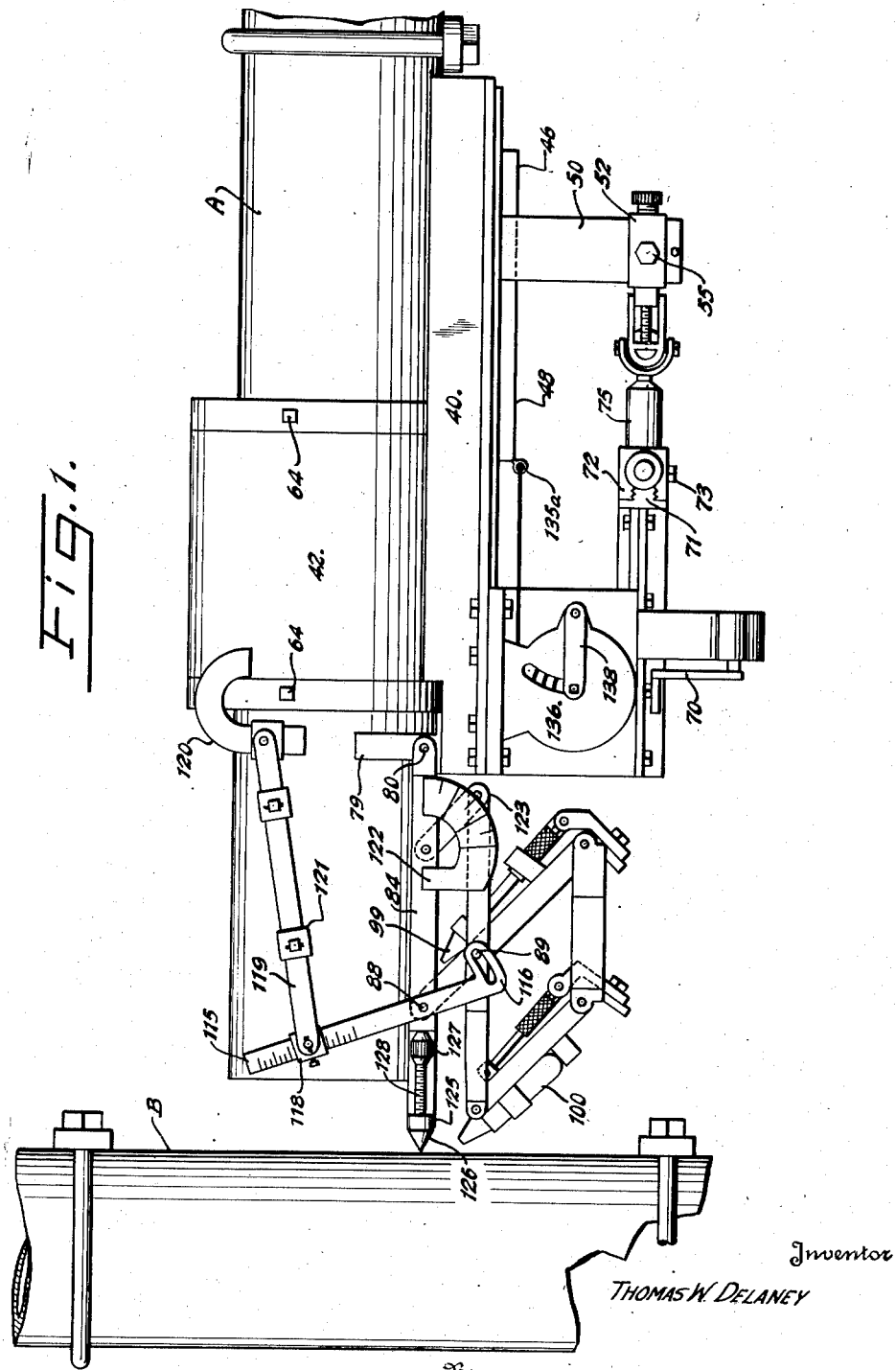

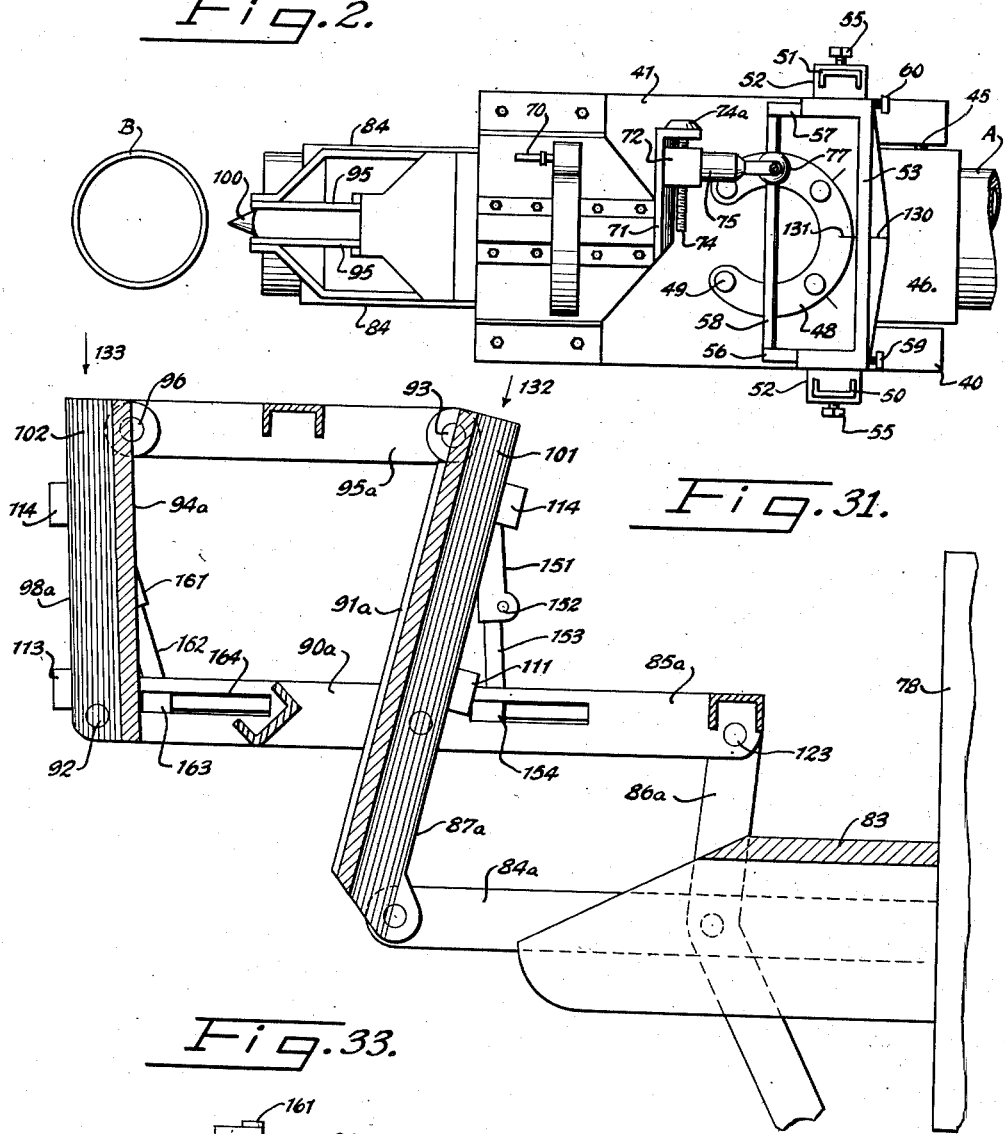
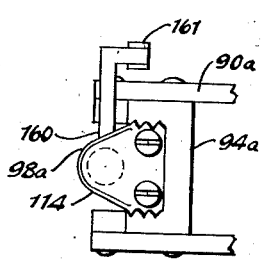

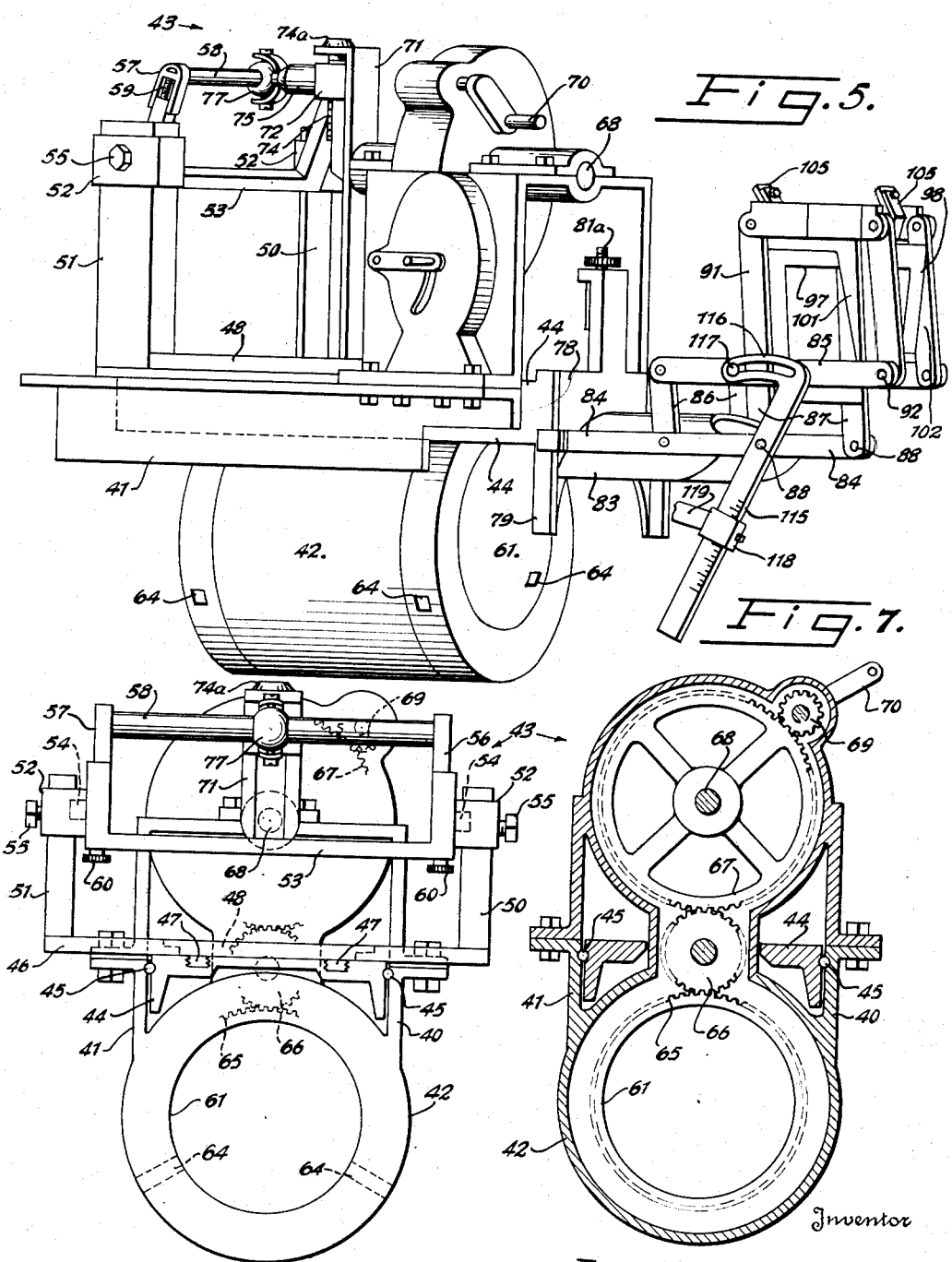

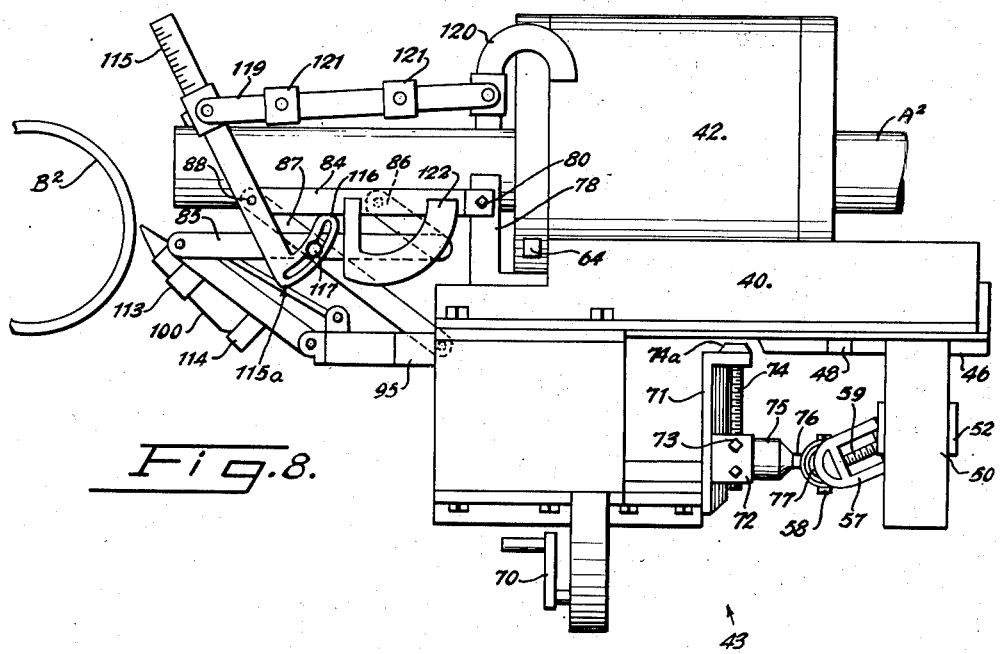
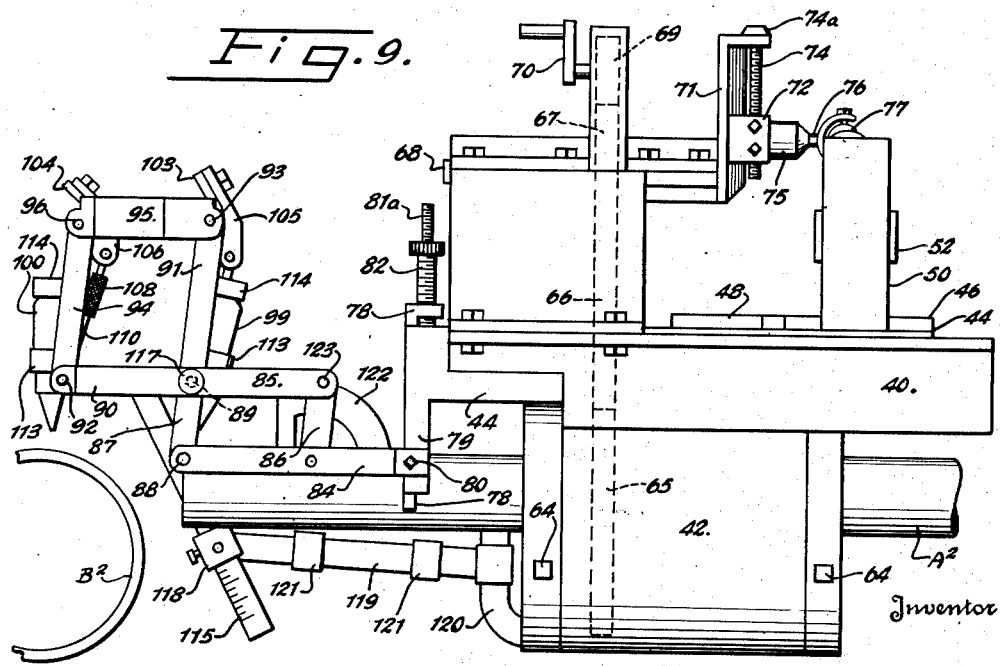

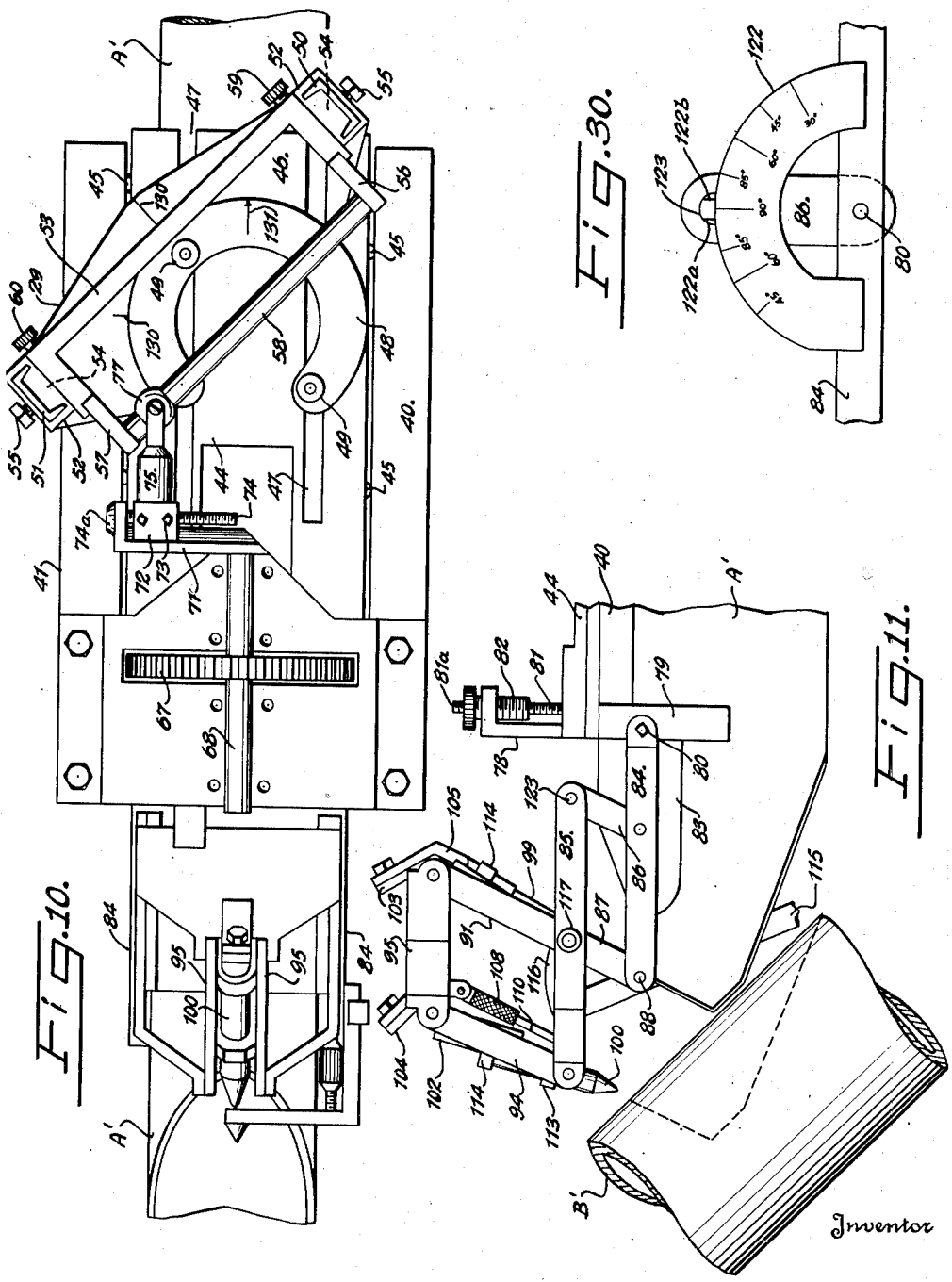

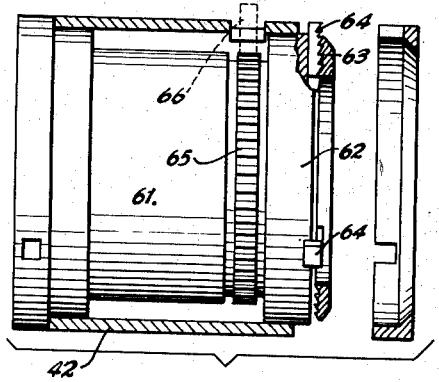
Fig.13.
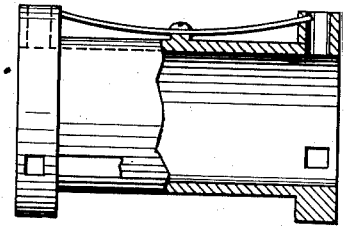
Fig.14.
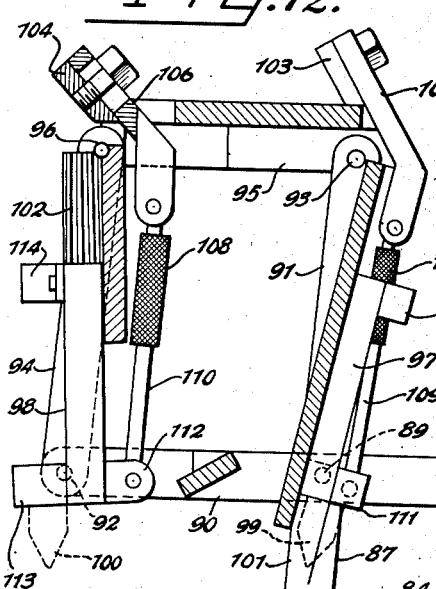
Fig.12.
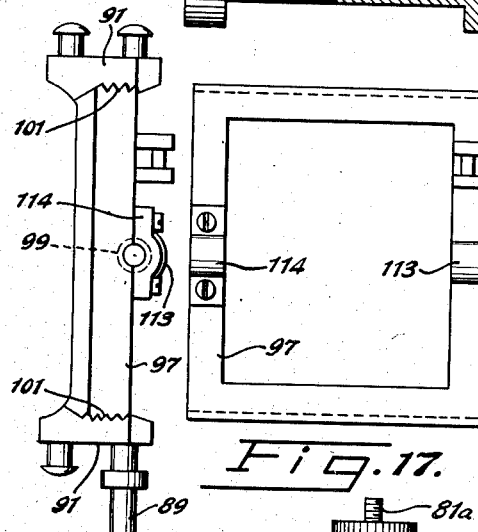
Fig.17.
Fig.15.
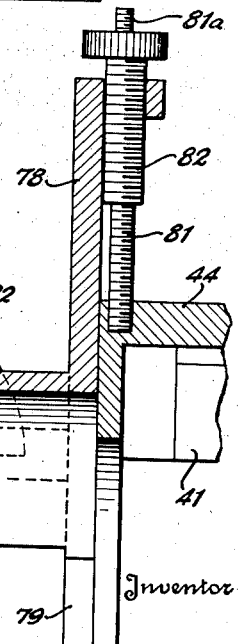
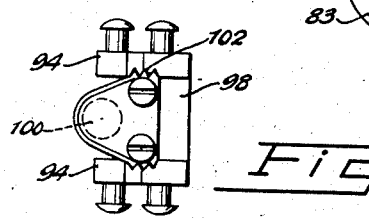
Fig.16.
Inventor
THOMAS W. DELANEY
By
Munn, Liddy and Glaccum
Attys.

Oct. 2, 1951  T. W. DELANEY  2,570,026
MACHINE FOR CUTTING CONTOURS IN PIPE SECTIONS FOR
JOINING MAIN AND BRANCH PIPES AT A DESIRED ANGLE
Filed April 20, 1949  9 Sheets-Sheet 8
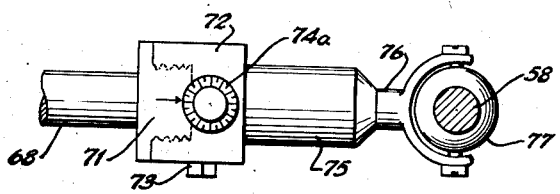
Fig. 18.
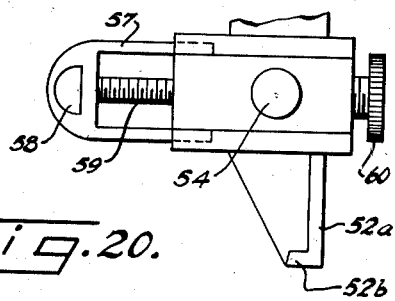
Fig. 20.
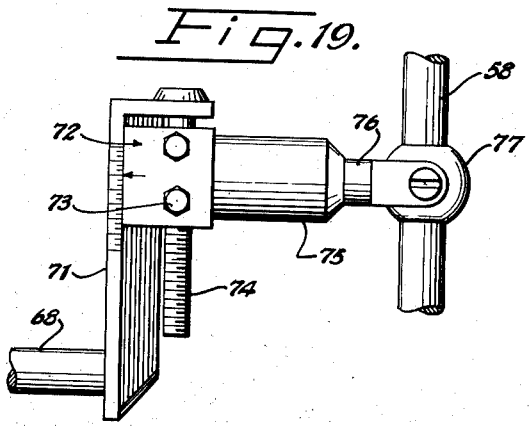
Fig. 19.
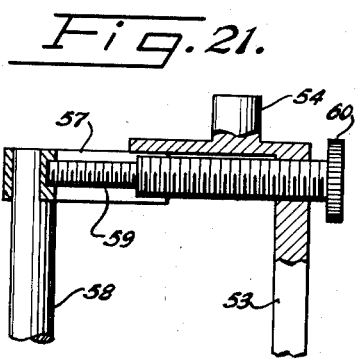
Fig. 21.
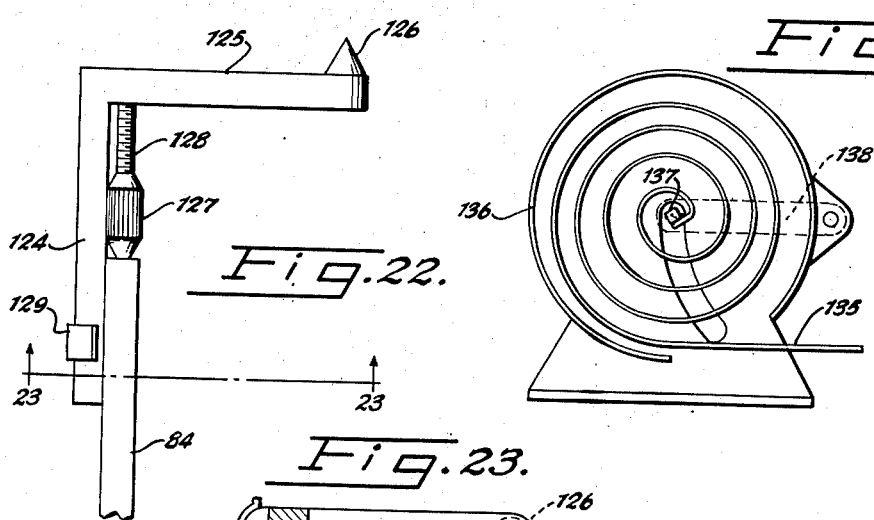
Fig. 22.
Fig. 23.
Fig. 24.
Inventor
THOMAS W. DELANEY
By
Munn, Liddy and Glaser
Attys Oct. 2, 1951 T. W. DELANEY 2,570,026
MACHINE FOR CUTTING CONTOURS IN PIPE SECTIONS FOR
JOINING MAIN AND BRANCH PIPES AT A DESIRED ANGLE
Filed April 20, 1949 9 Sheets-Sheet 9
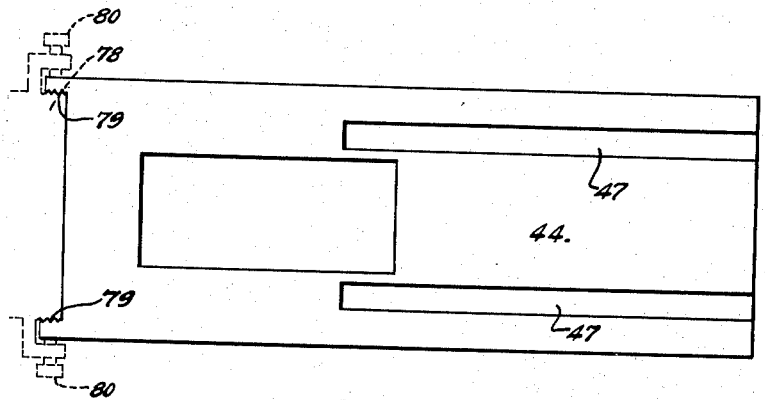
Fig. 25.   Fig. 26.
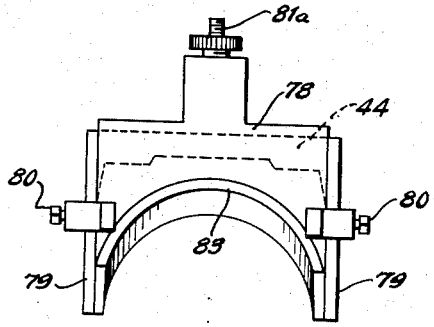
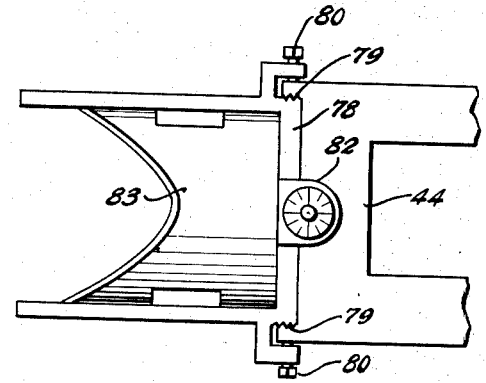
Fig. 27.   Fig. 28.
Fig. 29.
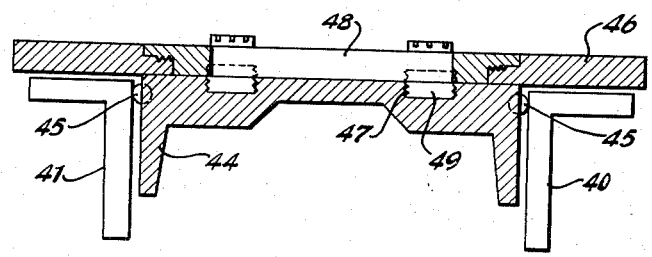
Inventor
THOMAS W. DELANEY
By
Munn, Liddy and Glaccum
Attys.

Patented Oct. 2, 1951

2,570,026

UNITED STATES PATENT OFFICE 2,570,026

MACHINE FOR CUTTING CONTOURS IN PIPE SECTIONS FOR JOINING MAIN AND BRANCH PIPES AT A DESIRED ANGLE

Thomas W. Delaney, St. Paul, Minn.

Application April 20, 1949, Serial No. 88,572

15 Claims. (Cl. 266—23)

This invention relates to a machine designed to guide an oxy-acetylene torch in the cutting of the end contours of branch pipes which it is desired to weld to a second or main pipe and also cutting a mating opening in such main pipe. The machine is so arranged that these contours of the two pipes may be cut either separately or simultaneously on the proper lines to fit said pipes together on a predetermined angle.

To the above end my present invention contemplates a mechanism for generating the outline of intersection between a main pipe and with a branch pipe at any angle desired for such intersection; resolving such generated outline into its axial and circumferential components, and combining these functions to guide the cutting flames of the torches.

My invention further comprehends providing means for changing the cutting angle of the torch flame with reference to the thickness of the pipe wall so as to properly bevel off the line of severance with a single pass of the torch around the edge of the developed contour thus furnishing uniform mating surfaces throughout the point of junction.

To these and other ends my invention comprises further improvements and advantages as will be further described in the accompanying specification, the novel features thereof being set forth in the appended claims.

In the drawings:

Figure 1 shows in plan two pipes of equal diameter to be united as a T or 90° joint with a machine embodying my invention mounted in the starting position on the branch pipe.

Figure 2 is a side elevational view of the elements as seen in the position of Fig. 1.

Figure 3 is a side view showing the machine rotated 90° from the position in which it is illustrated in Figs. 1 and 2.

Figure 4 is a side view showing the machine rotated 270°, or a three quarters turn, from the starting position.

Figure 5 is a perspective view of the machine, as seen when looking toward the right in Fig. 4 at the rear side thereof.

Figure 6 is an elevational view of the machine as seen when looking at the right hand end as depicted in Fig. 4 and the left hand end in Fig. 5.

Figure 7 is a vertical cross sectional view taken on the line 7—7 of Fig. 4 showing the gearing for rotating the machine around a pipe and synchronizing the movement of the contour generating mechanism.

Figure 8 is a side elevation of the machine, in the same rotative position as in Fig. 3, but showing the machine applied to shaping an offset junction between a large main pipe and a smaller size branch pipe.

Figure 9 is an elevational view similar to Fig. 8 with the pipes of different sizes and the machine turned through 180°.

Figure 10 is a view similar to Fig. 2 but illustrating the cutting of a contour on a branch pipe T joined to a main pipe at an angle of 45°, parts of the mechanism being omitted.

Figure 11 is a detail view of the torch carrying parallelogram of Fig. 10 shown in relation to the two pipes in same position as shown in Fig. 10 but cutting the 45° contour.

Figure 12 is a vertical section of the torch carrying mechanism in the open position as shown in Fig. 4.

Figure 13 is a detail view of the chucking sleeve for securing the machine to a branch pipe and shown partly in section.

Figure 14 is a similar view of an adapter for use in the sleeve of Fig. 13 for holding small diameter pipe.

Figure 15 is a detail view looking downwardly on the upper end of the inner pair of vertical arms of the parallelogram for carrying the inner torch which contours the branch pipe.

Figure 16 is a view the same as Fig. 15 illustrating the outer pair of vertical arms which carry the outer torch which contours the cut in the side of the main pipe.

Figure 17 is a detail plan view of the adjustable torch carrying frame supported between the arms shown in Fig. 15.

Figure 18 is a top plan view of the radial crank arm and spindle comprising part of the generator for developing contours.

Figure 19 is a side elevation of the parts shown in Fig. 18.

Figure 20 is a top plan view showing one end of the oscillating rod carried in the gimbal joint of the generator and the adjustable trunnion bearing by which the oscillatory movement of said rod is adjusted.

Figure 21 is an elevational view of parts shown in Fig. 20.

Figure 22 is a detail plan view of the locator or pointer.

Figure 23 is a cross sectional view taken on the line 23—23 of Fig. 22.

Figure 24 is a detail view in elevation of the spring balance, the proximate side of the case being removed.

Figures 25 and 26 are plan and end views, respectively, of the sliding carriage on the rear end of which the generator mechanism is mounted, and which carries on its forward end the torch operating mechanism shown in Fig. 12.

Figure 27 is a front elevation of the adjustable cross head on the forward end of the sliding carriage.

Figure 28 is a plan view of the forward end of said carriage as seen when looking down on the cross head.

Figure 29 is a horizontal cross sectional view taken on the line 29—29 of Fig. 10 showing the turntable of the generator and its locking ring on the sliding carriage.

Figure 30 is an enlarged detail view of a graduated quadrant which is used in setting the adjustment of the torch carrying parallelogram.

Figure 31 is a side elevation of the torch parallelogram similar to Fig. 12 but showing a modification of some of the parts especially designed for cutting thick wall pipe.

Figures 32 and 33 are views of the tops of the inner and outer torch carrying frames, respectively as these parts are seen in looking in the directions indicated by arrows 132 and 133 in Fig. 31.

Similar reference numerals, in the several figures, indicate similar parts.

To facilitate a description of the construction and operation of the apparatus embodying my invention I have shown it in Fig. 1, in association with a branch pipe A which, for example is to be welded to a main pipe B at right angles. Both pipes are of the same diameter and assumed to be relatively fixed in the same horizontal plane. In Figs. 10 and 11 said pipes, designated A', B', are depicted for jointure at an angle of 45° and in Figs. 8 and 9 they are designated as A², B², the branch pipe A² being of a smaller diameter.

The branch pipe which is first fixed at the angle of jointure with reference to the main pipe to which it is to be welded carries the mechanism which is capable of contouring the free end of this pipe and also excising from the proximate side of the main pipe a section or piece which leaves an opening exactly shaped throughout its perimeter to receive the correspondingly contoured end of said branch pipe.

Generally stated the mechanism comprises a frame work capable of being rotated a complete 360° around the branch pipe and carrying a contour generating mechanism which after an initial adjustment for angle effects is automatically operated upon movement of the frame to manipulate a lever system, which carrying one or more torches operates them forwardly and backwardly in their circumferential travel about the pipe to transcribe a previously selected pattern and thus remove the undesired portions of both the branch and main pipes.

To these ends I provide a frame comprising spaced longitudinally extending side bars 40—41 (Figs. 1 and 6) on which is supported at one side a tubular housing 42 and at the other side carries the contour generating mechanism, generally indicated by 43. The side bars extend in parallelism with and lie close to the branch pipe A and between them is a sliding carriage 44 supported on antifriction ball bearings 45 located in raceways formed between the outer lateral edges of the carriage and the inner faces of the bars, as shown in Fig. 29.

Part of the generating mechanism comprising a rotatably adjustable yoke having a base piece 46 rests on the face of the carriage, extending transversely thereof, and is adjustable longitudinally thereon. The face of the carriage is provided with spaced parallel slots 47 undercut on their edges. Cooperating with the yoke base is a clamping ring 48 secured in the slots by bolts 49. Adjustability between this stationary ring and the yoke is accomplished by undercutting the periphery of the ring and forming an interfitting rabbet on the arcuate cutout on the forward edge of the yoke base as shown in Fig. 29.

On the ends of the yoke base are outwardly extending pillars 50—51 on which there are movable blocks 52 in which a space bar oscillates on trunnions 54, it being held in adjusted position relatively to the base 46 by clamping screws 55. Each end of the space bar 53 extends laterally forwardly (Figs. 20–21) and their inner faces are slotted for the guidance of the spaced arms on blocks 56—57 which support the ends of a bar 58 in parallelism with the space bar 53. The latter is adjustable bodily relatively to points of suspension 54 of the space bar, the accomplishment of which is by means of two screws 59—60 having right and left hand threads, one being attached to the blocks 56—57 and threaded into the other while the latter is threaded into the space bar. There are suitable gauge marks on the sliding elements 56—57 and on the heads 60 of their adjusting screws for accurately locating the distance between the gauge bar 53 and the bar 58.

The space bar constitutes a cradle on which the bar 58 is carried and the extent of oscillatory movement of the latter varies in accordance with the setting of a control member which is set in adjusted position according to the distance through which the carriage 44 is to be moved under given conditions of operation. A maximum swing of 160° of the cradle is sufficient and to prevent excessive movement of the cradle I provide on the blocks 52 plates 52ª extending at opposite sides of the trunnions 54 having laterally extending shoulders 52ᵇ at their opposite ends with which the cradle arms 57 will engage at the extremes of their movement.

Another part of the generating mechanism is located at the forward part of the main frame and is actuated in synchronism with the rotary travel of the frame around the pipe. In the sleeve 42 at one side of the frame, shown in detail in Fig. 13, is journaled a rotary chuck 61 having end rings 62 provided with spiral grooves or "quick threads" 63 with which engage a series of radial grippers 64 lying in slots in the sleeve and by means of which the sleeve is clamped to a pipe inserted therethrough, as will be understood. The pipe carrying sleeve 61 is also provided with gear teeth 65 with which there meshes a pinion 66 (Fig. 7). The pipe being held stationary with the sleeve clamped thereto, it will be seen that rotation of the pinion will cause the frame work of the apparatus to move in a circular path around the pipe.

Pinion 66 is driven by a gear wheel 67 keyed to a shaft 68 journaled in the generator portion of the frame and is manually rotated as by a pinion 69 operated by a hand crank 70.

Shaft 68 extends rearwardly and carries a crank arm 71 (see Figs. 10, 18 and 19) which is formed with a rib provided with guideways on which there is slidingly supported a block 72 having a split or weakened leaf at one end enabling it to be firmly clamped to the crank by screws 73. Adjustment of the block with reference to the axis of shaft 68 is accomplished by a screw 74, supported on an overhanging lip on the crank, the head 74ª of which is graduated. As an aid in initial setting of the block 72 for regulating the oscillatory movement which it imparts to the rod 58 (on gauge bar 53) there are provided gauge marks on the crank 71 with which an index mark on the block registers as shown in Fig. 19.

Projecting rearwardly from the block 72 is a sleeve 75 and journaled therein is a stub shaft 76 having thrust bearings at its opposite ends within its supporting sleeve, as shown in dotted lines. A gimbal joint is provided at the outer extremity of the stub shaft comprising a ball 77 which slidingly carries the bar 58. It will therefore be seen that by manipulating the various adjustments provided for the contour generating portion of the apparatus the movement of the sliding carriage can be regulated to a nicety.

At the forward end of carriage 44 is a vertically adjustable yoke 78 (Figs. 27 and 28) carried in guideways 79 depending from the carriage and in which the yoke is clamped by set nuts 80. Up and down movement of the yoke is controlled by a double screw arrangement, as shown in Fig. 12, one portion 81 of which extending upwardly from the carriage and being threaded into another screw 82 while the latter is threaded into an overhanging shoulder on the yoke. The upper end of the inner screw is formed into a rod 81ª which is provided with graduations and projects through the knurled head of the larger screw the rotation of which determines the relative position of the yoke to the face of the carriage and the longitudinal axis of both the pipe chuck sleeve 61 and the generator shaft 68, the former being preferably considered as indicating the datum plane. Cooperating with the graduations on rod 81ª there are radial graduations on the face of the nut at the outer end of screw 82.

Projecting forwardly from the yoke 78 is an extension 83 in the form of a curved hood so shaped to give it added strength and rigidity to support the movable torch carrying elements which occupy a position on the forward end of the apparatus mounted in that side of the main frame work on which the contour generator is located. It will be understood that the torch carrying elements are governed in their movement by the reciprocating movement of the carriage slide 44 as this is advanced or retracted on the machine frame by the contour generator mechanism resulting from rotation of shaft 68.

On the opposite sides of the hood 83 and projecting forwardly from the crosshead are rigid arms 84 which support a parallelogram comprising parallel arms 85 connected thereto by a short link 86 and a lever 87, the pivot points of the latter being indicated at 88 and 89, reference being now made particularly to Fig. 12. A second parallelogram is created by extending the arm 85 and the lever 87, as indicated at 90 and 91, respectively, and connecting to their extremities by pivot pins 92—93, two other members 94—95. These last two members are jointed by pivot pins 96. The foregoing parts it will be seen constitute "lazy tongs" which are capable of extension and contraction.

The torch carrying frames are supported between the pairs of arms represented by 91 and 94. The frame 97, supported on the arms 91 is of necessity the full width between the supporting arms 84 and 85, and as shown in detail in Fig. 17, while the second or foremost frame 98 is much narrower, as illustrated in Fig. 16, the extremities of members 90—95 being bent inwardly to support the frame 98 centrally of the axis of the pipe chuck sleeve 42.

In order to provide for desired adjustment of the torches 99—100 (Figs. 9 and 16) for properly directing their flames as occasion may require I adjustably mount these frames on guides 101—102 which are inclined on divergent angles, the first being arranged to insure the flame intersecting the axis of pivot point 88 and the second to intersect the theoretical pivot axis at all slide and lever positions. As a simple adjustment means for the torch positions I provide on the top of member 95 two angular offset brackets 103—104 to which are adjustably bolted strap pieces 105—106 on the ends of which are swivelled knurled finger operated bushings 107—108 threaded on short rods 109—110 connected to bosses 111—112 on the lower edges of frames 97—98. The torches shown in dotted lines in Fig. 12, and in full lines in Fig. 9, are secured to said frames at their tips by bosses 113 and a removable clamping part 114 which fits over a pin on the head of a standard torch.

The opening and closing movement of the lazy tongs is controlled by a gauging member which is attached to the parallelogram at the pivot point 88 about which it swings and a stationary part of the frame work. This member is in the form of a lever 115 journaled on the pivot 88 and having a short arcuate slotted end 116 which may be clamped to the joint 89 of the parallelogram by a knurled nut 117. The longer arm of lever 115 carries a box 118 which may be locked by a thumb nut in a selected position with reference to the pivot point 88, as indicated by graduations on the arm, and from which there extends an arm or rod 119 pivoted to a bracket 120 projecting from the side of the tubular housing 42. Arm 119 is made in two parts so that it may be shortened or extended, these parts being secured rigidly by one or more slides or boxes 121 provided with thumb nuts.

The extent of movement for which the parallelogram is initially adjusted is indicated by graduations on an arcuate gauge plate 122 mounted on one of the arms 84 with which indices 122ª—122ᵇ on the stud 123, forming the pivot for the outer end of one of the links 86 (Fig. 1) cooperate. Index point 122ª indicates on quadrant 122 the instant angle between the axis of the pipe chuck sleeve 61 and the line of the cutting flame of the inner torch 99 located between the arms 91 and index point 122ᵇ indicates the angle between the axis of sleeve 61 and the torch 100 mounted between arms 94. The distance between the two readings is the constant difference in cutting angles due to the opposed inclination of the guide grooves 101—102 on the two sets of arms.

One of the arms 84 is extended beyond the pivot 88 and removably mounted thereon is an extension 124 (Fig. 22) at the forward end of which is a laterally projecting finger 125 carrying a pointer 126 lying in the plane of the axis of branch pipe A. This pointer can be projected by turning a bushing 127 on screw 128, attached to the inner side of the finger 125 and abutting the end of arm 84, to engage it with the proximate surface of the main pipe B (Fig. 1) for the purpose of setting the machine relative to main pipe B. When bushing 127 is at zero setting on screw 128, the point 126 defines the intersection of the cutting flame of torch 100 and the projected inside surface of the branch pipe. With the point 126 retracted a distance equal to the slant thickness through the main pipe wall and the machine is moved along the axis of the branch pipe until said point is in contact with outside surface of the main pipe, the cutting flame of torch 100 will penetrate the inside surface of the main pipe where the projected inside surface of branch pipe will ultimately intersect. The extension carrying the point is then removed. The device 125 is a distance or spacing gauge.

Referring again to the base 46 of the yoke of the contour generator, lying on the face of the sliding carriage 44 attention is called to the degree marks 130 thereon which are read against an index 131 on clamping ring 48 and serve to indicate the angular position of this yoke part of the mechanism with reference to the longitudinal axis of the branch pipe A.

Inasmuch as it frequently happens that a pipe welding operation must occur in situations where the machine will be inclined relative to a horizontal plane I have provided means for counterbalancing the weight of the sliding carriage and the parts thereon. Figure 24 illustrates a suitable device for this purpose comprising a coil spring 135 contained in a casing 136 bolted on one side of the main frame. The free end of the spring is to be attached to an outer point at one end of the carriage, such as the eye 135a, or to a projection on the other end of the carriage, depending which end of the machine is lowermost. The other end of the spring is attached to a manually rotated arbor 137 extending through radial slots in the casing and carried on pivoted arms 138 which may move to accommodate the spring coil when tension is applied thereto.

In the operation of this apparatus there are supplied tabulated index plates for all junctions commonly met in practice in order to obviate the necessity of repeated calculations by the operator and insure standard practice, this data applies to the traverse of slide carriage 44 and the angular traverse and terminal positions of the arms 91 and 94 carrying the torches 99—100.

In right angle pipe junctions, with pipes of equal diameter, such as shown in Figs. 1 to 4, both may be shaped at the same time. In the starting position the two torches are set so that the required angle of center line of the V groove, which is 45° is midway between the two index points 122a—122b on pin 123 (Fig. 30). This is accomplished by adjustment of the connection between levers 91 and 115, as by changing the length of rod 119.

The general practice in welding pipe junctions is to start the weld at the apex of the groove formed by beveling the walls of the pipes and usually the apex of the V groove is at the junction of the inside surfaces of the pipes. Hence one-half of the inside diameter of the pipes may be termed the root radius. Therefore one-half the diameter of the branch pipe A is set on rod 81a, by screw sleeve 82, for positioning the cross head 78. This adjustment places the pivot axis 88 of arms 87—91 and the theoretical axis of arm 94 at the proper point with reference to the axis of pipe chuck sleeve 61. The cross head 78 is then locked to the carriage 44 by set screws 80.

The spindle bearing 75 is set at the same radius from shaft 68 by moving the block 72 by means of screw 74 so that the head 77 of the gimbal joint will describe a circle equal to the inside diameter of the pipe. Next, the radius of movement of rod 58 on its trunnions 54 is set to the radius of the interior diameter of the main pipe by adjusting screws 59—60 in accordance with the graduations thereon.

The point of geometric intersection of two pipes of equal size removes too much of the wall of the main pipe and I therefore shorten the opening by approximately 10° at each point. This is accomplished in the machine by increasing the space between the divisions on the scales of the scale bar 53, which control the placement of bar 58, in the proportion of 1.015 to 1 in relation to the scale on crank arm 71. Hence with both adjustments reading alike the throw of rod 58 in turning through 80° from its central position will equal the movement of crank arm 71 when it moves through 90°. For these right angle pipe junctions the axis of the trunnions 54 is also set at right angles to the path of movement of carriage 44, as shown in Fig. 2.

At the starting position, as shown in Fig. 1, the included angle is 90° and the center line of the V groove in the pipe is 45°. At the other terminal position or point the included angle is 90° plus 80° and center line of V groove 85° from axis of sleeve 61 and branch pipe A, this axis being the base line for all angle settings. The difference between 45° and 85° being 40° is the angular traverse of the levers or arms 91, 94 required for cutting a 90° junction of equal sized pipes. The sleeve 118 on lever 115 is set at the radial distance from the pin 88 which will cause this angular traverse with the instant traverse of slide 44 which will be read on the graduations of the lever 115.

As the machine rotates about the sleeve 61 the gear wheel train correspondingly rotates the machine around the pipe A. This results in causing the shaft 68 to maintain the crank arm 71 in synchronism with the pipe chucking sleeve 61 so that the rod 58 oscillates towards and from slide 44 to effect reciprocation of the carriage. The longitudinal movement of the sliding carriage actuates the parallelogram mechanism whereby the flames emitted by the torches 99 and 100 will cut the contours on the two pipes in accordance with the initial adjustment of the apparatus as indicated by the several scales.

In Figs. 32, 33 and 34 I have shown a slight modification of the parallelogram and the means thereon for adjusting the torches especially designed for cutting the contours of main and branch pipes in which the walls are of appreciable thickness. This structure also has the advantage that there are no projections on the top of the parallelogram for effecting adjustment of the torches.

Figure 31 shows the parallelogram supported on the arm 84a projecting forwardly from the frame yoke 78 and comprising the arm 85a parallel thereto and connected to said arm by the levers 86a—87a, said arms being pivoted at their crossing points. The arm 87a extends beyond arm 85a, as indicated at 91a, and arm 85a projects beyond arm 87a, as indicated at 90a, so that the rectangular frame is completed by the additional arms 94a and 95a. The combined arms 87a—91a and arm 94a carry respectively the torch frames 97a—98a the required angles for which being obtained by the angular position given the respective arms in relation to their end pivot points. Adjustment of the torch frames crosswise relative to the parallelogram is accomplished thus: On one side of frame 97a there is a laterally extending finger 150 which extends beyond one of the arms 91a to which there is pivotally attached a split tubular bushing 151 that extends toward arm 85ᵃ. This bushing receives and is adjustably attached, as by a clamp bolt 152, to the free end of a rod 153 the other extremity of which is connected to a block 154 slidably supported in an elongated recess on arm 85ᵃ (Fig. 32).

Torch slide 98ᵃ is rendered similarly adjustable by providing it with a laterally extending arm 160, carrying a sleeve 161 which receives a rod 162 attached to a block 163 which is also slidable in an aperture 164 in the outer end of arm 90ᵃ (Fig. 31).

I claim:

1. In a machine for generating the path of juncture of a branch pipe with a main pipe, a chucking sleeve adapted to be concentrically fixed on a branch pipe, a frame rotatable about said chucking sleeve, a carriage guided in the frame to reciprocate in a plane parallel to axes of the sleeve and branch pipe, gear teeth formed on the sleeve, an idler gear rotatably mounted in said frame having teeth engaging those on the sleeve, a shaft journaled in the frame on the opposite side of carriage to chucking sleeve, its axis being parallel to that of the sleeve, a gear wheel fixed on said shaft and having teeth equal in number to those on said chucking sleeve and engaging the teeth of said idler gear on the opposite side thereof, a crank arm fixed on end of said shaft opposite gear wheel, a forked spindle mounted on crank arm, its axis being parallel to axis of shaft and spaced therefrom by half the inside diameter of the branch pipe, a drive pinion rotatably mounted in the frame having teeth engaging those of the shaft gear, a hand crank for turning said pinion for causing the shaft gear and crank arm to turn in respect to the frame and the frame to rotate about the axis of the chucking sleeve and branch pipe.

2. A machine for generating the path of juncture of a branch pipe with a main pipe comprising a sleeve adapted to be fixed on a branch pipe, a frame rotatable about sleeve, a carriage guided in said frame to reciprocate parallel to the axis of said sleeve, a shaft journaled in the frame opposite to the sleeve its axis being parallel to the axis of the sleeve, a gear wheel fixed on said shaft, said sleeve having gear teeth formed thereon, an idler gear having teeth engaging on opposite sides the teeth on said sleeve and the teeth of the gear wheel, a crank arm on end of the shaft, a forked spindle mounted on said crank arm having its axis parallel to the axis of the shaft and spaced therefrom by half the inside diameter of branch pipe, a sphere pivoted between forks of said spindle having a bore transverse to axis of the pivot, a rod slidable in the bore of said sphere and forming one side of a cradle frame, trunnions formed on each end of the frame and having their axes parallel to axis of the rod and spaced therefrom by half the inside diameter of the main pipe, said trunnions being mounted in bearing blocks clamped to pillars extended from a yoke mounted on the carriage and swingable thereon to set the angular relation between the axis of the trunnions and the axis of said gear shaft, said relation being equal to the angle at which the branch pipe is to be joined to the main pipe, means for securing said yoke in set position, said crank arm being rotatable to cause said machine to generate at the intersection of the axes of said spindle and rod the path of juncture of the branch pipe with the main pipe at the predetermined angle imparting longitudinal components of the juncture to the carriage and imparting related circular components to the carriage through encircling movement of the frame about the branch pipe.

3. In a machine for generating the path of juncture of any one of various sized branch pipes with any one of various sized main pipes, the combination of a sleeve having adjustable means for fixing it concentrically on a branch pipe, a frame rotatably mounted on said sleeve, a carriage guided to reciprocate in the frame in a plane parallel to axis of the sleeve, gear teeth formed on said sleeve engaging the teeth of an idler gear rotatably mounted in the frame, a gear wheel having teeth equal in number to those on the sleeve and engaging the teeth of said idler gear on the side opposite the sleeve, said gear wheel being fixed on a shaft journaled in the frame and having a crank arm fixed on one end thereof, a bearing and forked spindle mounted on the crank arm with adjustable means for setting the axis of the spindle at a distance from the parallel axis of the shaft equal to half the inside diameter of the instant branch pipe, a combining sphere pivoted between the forks of said spindle and having a bore transverse to axis of pivots, the sphere being slidable on a rod forming one side of a cradle frame, trunnions on each end of the frame having axes parallel to axis of rod, adjustable means to space the axis of the rod from the axis of said trunnions equal to half the inside diameter of the instant main pipe, the cradle frame being rockable about its trunnions which are supported in bearing blocks clamped to pillars, said pillars being extended from a yoke mounted on the carriage and swingable thereon to set the angular relation between the axis of said trunnions and the axis of the gear shaft, said relation being equal to the predetermined angle of junction between the branch pipe and the main pipe, means on the carriage to secure said yoke in set position, arms extending from each trunnion bearing block having ends bent to contact end bars of the cradle frame when it has rocked through 80 degrees to either hand of its central position and thus limit the arc included in the opening cut in main pipe to the desired 160 degrees, said crank arm being turnable in respect to the frame and held in fixed directional position by said gear wheel, idler gear and said chucking sleeve fixed on the branch pipe to cause said machine when turned about the chucking sleeve to generate at the intersection of the axes of said spindle and said rod, the path of juncture of the branch pipe with the main pipe at the predetermined angle imparting longitudinal components of the path of juncture to the carriage as reciprocal motion thereof and imparting related circular components to the carriage through encircling movement of the frame about the branch pipe and the chucking sleeve fixed thereon.

4. In a machine for generating the path of juncture of a branch pipe with a main pipe and imparting longitudinal and circular components of said path to a slidable carriage, a cross head adjustable relative to the axis of said branch pipe in guideways formed at the forward end of said carriage, spaced arms extended from said crosshead being parallel to the axis of the branch pipe, a lever pivoted between said arms, calibrated adjustment means on the crosshead and guideways to space the axis of the pivots from the axis of said branch pipe one half the inside diameter of the branch pipe, an arm attached to said lever at the pivot point, a slidable box on said arm, adjustable connecting means between said box and a frame to set the swing of the arm and lever about the pivot point caused by reciprocating motion of said carriage, a torch holder frame slidable between the side bars of said lever, a torch carried by said last mentioned frame said torch being so held that its flame cuts inside surface of the branch pipe at the intersection of the pivot axis of said lever with it, adjustable means for advancing and retracting the holder frame and torch to and from the pivot axis in accordance with varying slant thickness of pipe wall as the torch, holder frame and lever swing about said pivot axis to cut a path of juncture on the inside circumference of the branch pipe and to bevel the pipe wall at a predetermined angle to said path.

5. In a machine for generating the path of juncture of a branch pipe with a main pipe, imparting longitudinal and circular components of the path through associated means to a carriage slidable in a plane parallel to axis of the branch pipe, a crosshead guided on one end of the carriage adapted to be set relative to the axis of branch pipe, spaced arms on said crosshead, a lever pivoted between the arms, a link frame connected by pins to said lever and held in parallelism with said spaced arms by the links and connected thereto inwardly from said lever, a floating lever pivoted between the outer ends of the link frame and supported thereby, a second link frame connecting the free end of floating lever to the end of said first lever to cause the floating lever to swing about its theoretic pivot axis in synchronism with said first lever, a torch holder slidable in the floating lever and having a torch guided so that its cutting flame intersects said theoretic pivot axis in all holder positions, adjustable means for advancing and retracting the holder and torch in accordance with varying slant distance through the main pipe wall, a distance gauge retractible by the amount of slant distance through the main pipe wall on the line of the projected inside surface of the branch pipe to set the machine when the gauge is in contact with the outer surface of the main pipe so that the theoretic pivot axis will intersect the proximate inner surface and projected inner surface of the branch pipe which define the path of juncture and guide the torch along that path when said machine is turned about the branch pipe to cut the mating opening in the main pipe.

6. In a machine for generating the path of juncture of a branch pipe with a main pipe and guiding a torch in cutting end contour of branch pipe and perimeter of the mating opening in main pipe along that path, a lever pivoted to straddle branch pipe and swingable about its pivot axis, a floating lever connected by link frames to said first lever and adapted to swing about a theoretic pivot axis in synchronism with the first lever, a torch holder in said first lever guideways inclined inwardly from the plane of the first lever to bevel the branch pipe wall, a torch holder and torch in the guideways of said floating lever inclined outwardly to bevel the perimeter of the opening in the main pipe, the beveled surfaces cooperating to form a V-shaped groove in which weld metal may be deposited, adjustable means actuating the swing of said levers by which setting may be made between cutting branch pipe end and the opening in the main pipe to increase or decrease the incline of the beveled pipe walls to each other.

7. A machine for contouring the end of a branch pipe and the side of a main pipe for joining the two pipes at an angle, said pipes being fixed angularly in juxtaposition to each other, the combination with a frame adapted to be mounted on a branch pipe for rotational movement about it, gearing means for so rotating the frame, a reciprocating carriage on the frame, adjustable driving connections between the gearing and carriage, and a yoke on the carriage adjustable transversely of the branch pipe, a torch carrier carried by the yoke comprising arms connected for parallel movement in a direction longitudinally of the branch pipe, said arms being spaced one ahead of the other in relation to the side of the main pipe and the proximate end of the branch pipe, a connection between the carrier and the frame of the machine for tilting it conjointly with the movement imparted to it by the reciprocation of the carriage and separate torches on the carrier arms arranged to direct their flames against the two pipes to simultaneously scribe complementary interfitting contour lines on the respective pipes.

8. In a pipe contouring machine, the combination with a frame, a pipe chuck journaled at one side thereof comprising a gear ring, a drive gear at the other side of the frame and a pinion intermeshing with the ring and gear for effecting relative rotary movement of the frame and a pipe in the chuck, a sliding carriage on the frame and means for adjustably controlling its reciprocatory movement comprising a cradle rotatably adjustable on the carriage and oscillated by said drive gear, a torch carrier rockably connected to the frame and connected to the carriage for rocking movement longitudinally of the frame, an adjustable connection between the carrier and frame for controlling the extent of its rocking independently of the movement imparted to the carrier by the carriage and a flame generating torch on the carrier.

9. A device of the character described comprising a frame, a pipe chuck at one side thereof having a gear ring, a drive gear on the opposite side of the frame for effecting relative rotation between the frame and a pipe in the chuck, a reciprocating carriage on the frame, a turntable on the carriage, an oscillatory cradle adjustable on the turntable and also adjustable toward and from the carriage, an adjustable crank connection between the drive gear and the cradle by means of which the extent of travel of the carriage may be predetermined, a contour scriber carried on the frame and rockable in a direction longitudinally of the axis of the pipe chuck and a control connection between the scriber and the frame.

10. A device of the character described comprising a frame, a pipe chuck at one side thereof, a drive gear for effecting a relative rotary movement between the frame and a pipe in the chuck located at the opposite side of the frame, a reciprocating carriage on the frame and a contour scriber operated by movement of the carriage and extending beyond one end of the frame and the pipe chuck, said scriber being in the form of a parallelogram and actuated by the movement of the carriage in the plane of the axis of said chuck, an adjustable connection between the drive gear and said carriage comprising a crank rotated in respect to said frame by the gear and a cradle oscillated by the crank, said cradle being secured to the carriage and adjustable at an angle to the direction of movement of the carriage.

11. In a machine generating the path of juncture of a branch pipe with a main pipe, a shaft journaled in a frame, a gear wheel fixed on one end of the shaft, a drive pinion rotatably mounted in said frame its teeth engaging teeth of said gear wheel, a hand crank fixed on the arbor of said pinion, a crank arm fixed on the end of the shaft opposite said gear wheel, a forked spindle mounted on the crank arm its axis being parallel to axis of shaft and spaced therefrom by half the diameter of the branch pipe, a combining sphere pivoted between forks of said spindle having a bore transverse to its pivot axis, a rod slidable in said bore and forming one side of a cradle frame, trunnions formed on each end of the cradle their axis being parallel to the axis of said rod and spaced therefrom by half the diameter of the main pipe, the cradle being rockable about trunnions in bearing blocks clamped to pillars extended from a yoke, arms extended from each bearing block having ends bent to contact the end bars of said cradle frame when it has rocked through eighty degrees in either direction of its central position and thus eliminate the sharp points of a geometric junction between two pipes of equal size, said yoke being swingably mounted on a carriage, the carriage being guided in the frame to reciprocate in a plane parallel to axis of said shaft for the purpose of generating at the intersection of the axes of said spindle and rod the path of juncture of a branch pipe with a main pipe and transmitting the axial components of that path as reciprocal motion thereof to the said carriage when the hand crank, gear wheel, shaft and crank arm are rotated in respect to frame.

12. A machine for generating the path of juncture of a branch pipe with a main pipe comprising a rod forming one side of a cradle frame, trunions formed on each end of the frame with their axes parallel to the axis of the rod and spaced therefrom by one half the inside diameter of the main pipe, said trunnions being mounted in bearing blocks clamped to pillars extended from a yoke mounted on a carriage, the carriage being guided to reciprocate in a frame, said yoke being swingable on said carriage to set the angular relation between the axis of the trunnions and the line of motion of the carriage, said relation being equal to the angle at which the branch pipe is to be joined to the main pipe, means for securing said yoke in set position, a shaft journaled in said frame its axis being parallel to line of motion of said carriage, a gear wheel fixed on the shaft its teeth engaging teeth of a drive pinion rotatably mounted in frame, a hand crank keyed to said drive pinion, a crank arm fixed on end of shaft opposite the gear wheel, a forked spindle mounted on the crank arm having its axis parallel to the axis of said shaft and spaced therefrom by one half the inside diameter of the branch pipe, a sphere pivoted between the forks of said spindle and having a bore transverse to its pivot axis and slidable on said rod holding its axis and the axis of said spindle in intersection for the purpose of generating at said intersection of axes when said hand crank, drive pinion, gear wheel, shaft and crank arm are rotated the path of juncture of a branch pipe with a main pipe at desired angle and transmitting axial components of that path to said carriage.

13. A machine for generating path of juncture of a branch pipe with a main pipe, imparting axial components of that path as reciprocal motion to a carriage guided in a frame and related circumferential components as rotary motion of frame and carriage about branch pipe comprising two spaced arms extended from one end of the carriage parallel to the axis of the branch pipe, a torch carrier frame pivoted between said spaced arms on a pivot axis transverse to the axis of the branch pipe and spaced therefrom by one half the diameter of branch pipe, a link frame connected to each side of the carrier frame by pins equally spaced from the pivot axis of said carrier frame and connected at inboard end by like spaced pins and links to spaced arms holding the link frame parallel to the spaced arms and the axis of branch pipe, a second torch carrier frame swingably mounted between the outboard ends of the link frame and connected to said first carrier frame by a second link frame, forming a second parallelogram causing the second carrier frame to swing about a theoretic pivot axis parallel to the pivot axis of the first carrier frame and spaced therefrom by pin spacing of first and second link frames, a second torch holder slide guided in the second carrier frame to project cutting flame through the theoretic pivot axis, adjustable connections between the link frames and torch holder slides to advance and retreat the slides and torches in accord with change in slant distance through the pipe walls as the angle of cutting flame in respect to walls varies and to amplify this movement when radial thickness of wall is increased for the purpose of cutting the end contour of branch pipe in accordance with path of juncture, beveling pipe wall to provide groove for deposit of weld metal, and cutting and beveling mating opening in main pipe.

14. A machine for generating the path of juncture of a branch pipe with a main pipe, imparting axial and circumferential components of that path to a carriage, spaced arms extended from one end of said carriage, a torch carrier frame pivoted between the arms, a second torch carrier frame spaced by link frames from first carrier frame to swing about a theoretic pivot axis equally spaced from pivot axis of said first named carrier frame, a locator gauge removably mounted on one of the spaced arms its contact point indicating the theoretic pivot axis of second torch carrier frame when the locator gauge is extended, calibrated adjustment means for retracting said contact point equal to distance through instant main pipe wall on a line parallel to the axis of the branch pipe for the purpose of locating machine in respect to main pipe to cause torch held in slide of second carrier frame to cut the path of juncture on inside circumference of instant main pipe.

15. A machine for generating the path of juncture of a smaller branch pipe with a main pipe at a desired angle the axis of the branch pipe being in offset relation to the axis of main pipe, and guiding a torch in cutting the end contour of the branch pipe and mating opening in the main pipe, a shaft journaled in a frame, a gear wheel fixed on one end of shaft, a drive pinion rotatably mounted in frame its teeth engaging the teeth of gear wheel, a hand crank fixed on the arbor of the drive pinion, a crank arm fixed on the end of said shaft opposite the gear wheel, a forked spindle mounted on said crank arm its axis being parallel to the axis of said shaft and spaced therefrom by half the diameter of the branch pipe, a sphere pivoted between forks of spindle and having a bore transverse to its pivot axis, a rod slidable in said bore of the sphere forming one side of a cradle frame, trunnions formed on each end of the cradle frame, bearing blocks in which said trunnions are mounted clamped to pillars extended from a yoke, the yoke being swingably mounted on a carriage guided to reciprocate in said frame in a plane parallel to the axis of said shaft, said bearing blocks being movable on pillars toward the carriage to set the trunnion axis in predetermined offset relation to the axis of shaft, a chucking sleeve adapted to be concentrically fixed on a branch pipe mounted in said frame on opposite side of the carriage from said shaft the axes of the shaft and sleeve being parallel, spaced arms extended from the end of said carriage, a torch carrier frame pivoted between said arms, a second torch carrier frame spaced forwardly from said first carrier frame by parallel link frames to cause the carrier frames to swing in unison, an operating lever attached to said first carrier frame, adjustable connections between the operating lever and machine frame to swing the carrier frames with reciprocal motion of said carriage, for the purpose of generating the path of juncture of a branch pipe with a main pipe in the predetermined angular and offset relations, guiding a torch in cutting that path as the end contour of the branch pipe and guiding torch in cutting the mating opening in the main pipe when positioned in predetermined angular and offset relation to branch pipe.

THOMAS W. DELANEY.

REFERENCES CITED

The following references are of record in the file of this patent:

UNITED STATES PATENTS

| Number | Name | Date |
| --- | --- | --- |
| 1,826,164 | Carrier, Jr., et al. | Oct. 6, 1931 |
| 1,885,107 | Brown | Nov. 1, 1932 |
| 1,923,778 | Douglass | Aug. 22, 1933 |